Patented Nov. 20, 1951

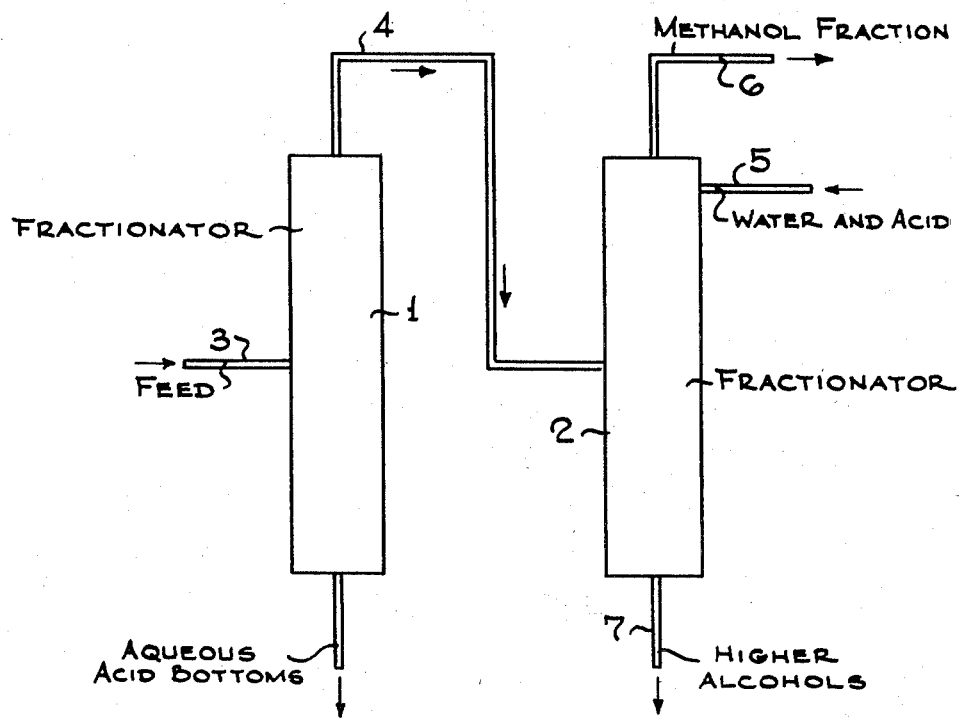

2,576,030

UNITED STATES PATENT OFFICE 2,576,030

DISTILLATION OF CARBONYL COMPOUNDS FROM ALCOHOLS

Charles E. Morrell, Westfield, and Richard F. Robey, Cranford, N. J., assignors to Standard Oil Development Company, a corporation of Delaware Application December 29, 1947, Serial No. 794,216

5 Claims. (Cl. 202—57)

This invention relates to a practical method of separating wide-boiling mixtures of oxygenated organic compounds and is concerned with the controlled use of water as a refluxing medium in a continuous fractional distillation of such wide-boiling mixtures.

Wide-boiling mixtures of oxygenated organic compounds may be obtained for example by the Fischer synthesis in which carbon monoxide is reacted with hydrogen to produce a mixture of hydrocarbons and oxygenated organic compounds which separate into an oil layer and a water layer, both of which contain various ketones, aldehydes, ethers, acetals, esters, carboxylic acids, lower primary and secondary alcohols, tertiary alcohols and even higher alcohols. Still another source of these wide-boiling mixtures of oxygenated organic compounds is in the products of hydrocarbon oxidation where both oil and water layers are obtained both of which contain oxygenated organic compounds. A typical example of the composition of a water layer obtained in the Fischer process is as follows:

| | Weight per cent |
|---|---|
| Water | 90.1 |
| Alcohols (methyl, ethyl, normal propyl, butyl, etc.) | 3.7 |
| Aldehydes ($C_2$–$C_5$) | 1.0 |
| Ketones ($C_3$–$C_5$) | 0.6 |
| Esters | 0.1 |
| Acids | 4.5 |
| Hydrocarbons | trace |
| Ethers | trace |

Normally the oxygenated compounds are obtained by initially distilling the crude water layer to remove all the more volatile oxygenated compounds including those other than acids, and then fractionally distilling these volatile compounds into narrow boiling fractions. However, during these distillations and particularly during the fractionation into narrow boiling cuts, it has been discovered that acetals and ketals are formed presumably as a result of the reaction between alcohols and aldehydes on one hand and alcohols and ketones on the other. This has been found to be particularly true when the overhead from the fractionation zone is essentially anhydrous, i. e. does not distill over as aqueous azeotropes. For example, methanol forms no azeotrope with water therefore in distilling this compound overhead, essentially anhydrous conditions are present and the tendency for acetal or ketal formation is at a maximum.

As a result of acetal and ketal formation, the aldehydes and ketones, which boil below methanol and ethanol, are converted into compounds which boil azeotropically in the same range as the higher alcohols. Furthermore the lower alcohols may be carried in combined form into the higher boiling alcohol fractions where they may appear due to subsequent hydrolysis.

It is thus evident that the distillation of a mixture of oxygenated compounds obtained in the Fischer synthesis is beset by manifold difficulties. It is, therefore, the main object of this invention to provide a method for overcoming the above difficulties and to obtain more complete recovery of the lower aldehydes and ketones.

It is a further object of this invention to provide a method for reducing the carry-over of aldehydes and ketones into higher boiling fractions.

These and other objects of this invention are accomplished by introducing a sufficient amount of a material, such as water, preferably containing a small amount of an acid, into the top of the distillation column in which the mixture of oxygenated compounds from the water layer of a Fischer synthesis process is being distilled to maintain the pH of the reflux no greater than 7, preferably around 6. The amount of water is small, generally not over 1 or 2 volume per cent of the total internal reflux and in no case should it be over 50%, otherwise the relative volatilities of the compounds being distilled will be altered and in many cases reversed so that products ordinarily appearing in the bottoms will be rendered more volatile and will be withdrawn overhead.

In the accomplishment of the foregoing and related ends the invention then comprises features hereinafter described and particularly pointed out in the claims, the following description and annexed drawings setting forth in detail certain illustrative embodiments of the invention, these being indicative, however, of but a few of the various ways in which the principle of the invention may be employed.

Referring to the drawing, I represents a fractional distillation column in the interior of which is provided means for obtaining efficient countercurrent liquid vapor contacting, e. g. such conventional means as bubble plates or packing and 2 represents a similar tower for further separating the overhead from tower 1.

A fraction of the above composition obtained in the Fischer synthesis is introduced by line 3 into the midpoint of column 1 where it is distilled to remove overhead all compounds including alcohols, which are more volatile than the acids. These compounds are withdrawn through line 4 and introduced into the midpoint of column 2 where they are subjected to fractionation to remove overhead a methanol fraction, consisting essentially of acetaldehyde, propionaldehyde, methanol and acetone. Since none of these compounds form azeotropes with water, the overhead is essentially anhydrous and the methanol can easily react with the acetaldehyde and propionaldehyde forming acetals and under certain conditions with the acetone forming a ketal. These resulting compounds are higher boiling than any of the above compounds and thus are condensed and carried back to the bottom of the column, resulting in loss of valuable compounds overhead.

According to the present invention, the formation of these acetals and ketals is substantially prevented by adding a small amount of water, preferably acidified, to the top of column 2. The acid used is any suitable mineral acids, such as phosphoric, sulfuric, hydrochloric and the like or any soluble organic acid capable of producing the desired pH change, for example, acetic, propionic, maleic, phthalic, benzoic and/or the like. It is sufficient only to add enough to change the pH to about 6. For example, about 0.25% phosphoric acid has been found sufficient. A small amount of slightly acidified water is continuously added to the column 2 through line 5 so that the internal reflux in the column contains about 1-2% water which is sufficient to hydrolyze any acetals formed and maintain a maximum withdrawal of alcohol, aldehydes and ketones overhead. The overhead fraction, withdrawn through line 6 may be subjected to further distillation to effect separation of the individual compounds. Similarly the bottoms fraction, containing all the alcohols boiling above methanol is withdrawn through line 7 and may likewise be fractionated into additional fractions.

While one specific process involving the novel steps of the present invention as well as one specific apparatus for carrying out the same has been described in detail it is to be understood that this description is illustrative only and for the purpose of making the invention more clear and it is not intended that the invention be construed as limited to the details of the description except insofar as such limitations have been included in the terms of the following claims.

The nature and objects of the present invention having been set forth and one specific illustration of the same given what is claimed as new and useful and desired to be secured by Letters Patent is:

1. In a process of distilling aldehyde and ketone components which are lower boiling than ethanol and which do not form azeotropes with water from an aqueous alcohol solution, wherein vapors of said aldehyde and ketone components tend to become anhydrous as they pass upwardly countercurrent to internal liquid reflux in an upper part of a fractional distillation zone, the method of preventing undesired reactions of said aldehyde and ketone components under the distillation conditions which comprises continuously introducing a small amount of acidified water into the internal liquid reflux at the top of said distillation zone, and withdrawing from the bottom of the fractional distillation zone the residual aqueous alcohol solution freed of said aldehyde and ketone components.

2. In a process of distilling methanol, acetaldehyde, propionaldehyde and acetone from an aqueous solution containing alcohols higher boiling than methanol, wherein vapors of the volatilized methanol, acetaldehyde, propionaldehyde and acetone tend to become anhydrous as they pass upwardly countercurrent to internal liquid reflux in an upper part of a fractional distillation zone, the method of preventing acetal and ketal formation which comprises continuously supplying a small amount of water in the internal liquid reflux throughout the fractional distillation zone without substantially altering the relative volatilities of the individual organic compounds in the aqueous solution, and withdrawing a residual aqueous solution containing the alcohols higher boiling than methanol as a bottoms product from said distillation zone.

3. In a process according to claim 2, said acidified water being supplied in an amount less than 50 volume percent of the internal liquid reflux and containing about 0.25% phosphoric acid.

4. In a process of distilling a low boiling fraction containing acetaldehyde, propionaldehyde and acetone from an aqueous mixture of organic oxygenated compounds containing methanol and higher boiling alcohols, wherein a vapor fraction comprising methanol, acetaldehyde, propionaldehyde and acetone but substantially free of the higher boiling alcohols tends to become anhydrous as it passes upwardly countercurrent to internal liquid reflux in an upper part of a fractional distillation zone, the method of preventing undesired reactions of said aldehydes and ketone with the methanol in said vapor fraction under the distillation conditions, which comprises continuously introducing a stream of water into the upper part of the fractional distillation zone, thus maintaining a small amount of water dissolved in the internal liquid reflux at a pH no greater than 7 throughout the fractional distillation zone, and continuously withdrawing an aqueous residue containing said higher boiling alcohols.

5. In a process of distilling an aqueous mixture consisting of an alcohol and at least one low-boiling carbonyl component said carbonyl component being selected from the group consisting of acetaldehyde, propionaldehyde and acetone, and said water-soluble alcohol boiling at a higher temperature than said carbonyl component, wherein carbonyl component vapors tend to become anhydrous as they pass upwardly countercurrent to internal liquid reflux in an upper part of a fractionation zone, the method of preventing undesired reaction between carbonyl component vapors and the alcohol under the distillation conditions which comprises continuously supplying a small amount of water insufficient to alter the relative volatility of said carbonyl and alcohol components to said internal liquid reflux in the uper part of the fractionation zone, maintaining the resulting aqueous liquid reflux at a pH no greater than 7 throughout the fractionation zone, distilling at least one of said carbonyl components non-azeotropically in essentially anhydrous condition overhead from said fractionation zone, and withdrawing from a bottom part of the fractionation zone the residue internal liquid reflux containing the water and said alcohol.

CHARLES E. MORRELL.
RICHARD F. ROBEY.

REFERENCES CITED

The following references are of record in the file of this patent:

UNITED STATES PATENTS

| Number | Name | Date |
|---|---|---|
| 996,328 | Guillaume | June 27, 1911 |
| 1,933,505 | Merley | Oct. 31, 1933 |
| 2,151,461 | Britton et al. | Mar. 21, 1939 |
| 2,198,651 | Bludworth | Apr. 30, 1940 |
| 2,290,442 | Metzl | July 21, 1942 |
| 2,294,346 | Swallen | Aug. 25, 1942 |